US012081934B2

(12) United States Patent
Hatipoglu et al.

(10) Patent No.: US 12,081,934 B2
(45) Date of Patent: Sep. 3, 2024

(54) DYNAMIC VALVE FOR AN ELECTRONIC DEVICE

(71) Applicant: Apple Inc., Cupertino, CA (US)

(72) Inventors: Gokhan Hatipoglu, Santa Clara, CA (US); Peter C. Hrudey, San Mateo, CA (US); Scott C. Grinker, Belmont, CA (US); Ankur Jain, Los Gatos, CA (US); Patrick B. Wright, Dartmouth (CA)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 17/879,417

(22) Filed: Aug. 2, 2022

(65) Prior Publication Data

US 2023/0086021 A1 Mar. 23, 2023

Related U.S. Application Data

(60) Provisional application No. 63/247,435, filed on Sep. 23, 2021, provisional application No. 63/245,570, filed on Sep. 17, 2021.

(51) Int. Cl.
*H04R 1/28* (2006.01)
*H04R 1/10* (2006.01)

(52) U.S. Cl.
CPC .................................. *H04R 1/1058* (2013.01)

(58) Field of Classification Search
CPC .. H04R 1/2823; H04R 1/2826; H04R 1/2846; H04R 1/2849; H04R 2460/11; F16K 3/0281; F16K 3/029; F16K 3/03; F16K 3/08; F16K 3/085; F16K 99/0011; F16K 99/0051
See application file for complete search history.

(56) References Cited

U.S. PATENT DOCUMENTS 4,190,085 A * 2/1980 Hasa .......................... F16K 3/03 138/45
6,549,635 B1 * 4/2003 Gebert ................. H04R 25/652 381/322
6,665,412 B1 * 12/2003 Mizoguchi ............. H04R 1/347 381/345
6,962,170 B1 * 11/2005 Sherman ............. F16K 99/0046 137/625.33

(Continued)

FOREIGN PATENT DOCUMENTS

CN 112770243 A * 5/2021 ............. H04R 25/65
EP 2835987 A1 * 2/2015 ........... H04R 25/456

(Continued)

OTHER PUBLICATIONS

Li, Mary, et al., "Fabrication of microshutter arrays for space application," Proceedings of SPIE—The International Society for Optical Engineering, Apr. 2001, pp. 295-303.

(Continued)

*Primary Examiner* — Ryan Robinson
(74) *Attorney, Agent, or Firm* — Aikin & Gallant, LLP

(57) ABSTRACT

A portable electronic device comprising: an enclosure having an enclosure wall that forms an interior chamber and an opening to an environment surrounding the enclosure wall; and a valve comprising a number of sliding actuators operable to open and close the opening to the environment surrounding the enclosure wall.

19 Claims, 4 Drawing Sheets

(56) References Cited

U.S. PATENT DOCUMENTS

| | | | | |
|---|---|---|---|---|
| 9,107,003 | B2 | 8/2015 | Dix et al. | |
| 9,208,759 | B2 * | 12/2015 | Millender, Jr. | G10D 13/02 |
| 9,706,290 | B2 | 7/2017 | Grinker | |
| 9,774,941 | B2 | 9/2017 | Grinker | |
| 10,165,348 | B2 * | 12/2018 | Kirsch | H04R 3/04 |
| 10,469,940 | B2 | 11/2019 | Taylor et al. | |
| 11,222,648 | B1 * | 1/2022 | Hansen | A61M 16/024 |
| 2004/0159813 | A1 * | 8/2004 | Sherman | F16K 99/0001 251/248 |
| 2012/0033831 | A1 | 2/2012 | Leitner | |
| 2012/0201406 | A1 * | 8/2012 | Yamaguchi | H04R 1/1016 381/309 |
| 2013/0223023 | A1 | 8/2013 | Dehe et al. | |
| 2015/0014796 | A1 | 1/2015 | Dehe | |
| 2016/0068112 | A1 * | 3/2016 | Price | H04R 1/02 381/86 |
| 2016/0079947 | A1 * | 3/2016 | Kirsch | G10L 21/0208 381/107 |
| 2016/0330537 | A1 * | 11/2016 | Barrentine | H04R 1/1008 |
| 2016/0330546 | A1 * | 11/2016 | Barrentine | G10K 11/17857 |
| 2018/0233827 | A1 | 8/2018 | Agranat et al. | |
| 2019/0261082 | A1 * | 8/2019 | May | H04R 1/2819 |
| 2019/0379962 | A1 * | 12/2019 | Navid | H04R 1/38 |
| 2020/0154193 | A1 * | 5/2020 | Hanes | H04R 3/007 |
| 2020/0200286 | A1 * | 6/2020 | Kim | F16K 17/0413 |
| 2020/0260197 | A1 * | 8/2020 | Thomsen | H04R 25/48 |
| 2020/0314532 | A1 * | 10/2020 | Kuipers | H04R 25/652 |
| 2020/0329321 | A1 * | 10/2020 | de Ruijter | H04R 25/48 |
| 2020/0352788 | A1 * | 11/2020 | Van 'T Hof | H04R 1/1016 |
| 2021/0112342 | A1 * | 4/2021 | Xu | G06F 1/1626 |
| 2021/0174778 | A1 * | 6/2021 | Goldstein | A61B 5/6817 |
| 2021/0258677 | A1 * | 8/2021 | Choi | H04R 1/1075 |
| 2021/0337294 | A1 * | 10/2021 | Dory | H04R 1/1008 |
| 2021/0377643 | A1 * | 12/2021 | Igarashi | H04R 1/42 |
| 2021/0409874 | A1 * | 12/2021 | Lara-Quintanilla | H04R 9/025 |
| 2022/0174435 | A1 * | 6/2022 | Mehr | H04R 25/603 |
| 2023/0007384 | A1 * | 1/2023 | Christensen | H04R 1/1041 |

FOREIGN PATENT DOCUMENTS

| | | | | |
|---|---|---|---|---|
| EP | 3637799 | A1 * | 4/2020 | H04R 25/652 |
| FR | 936462 | A * | 7/1948 | |
| GB | 145100 | A * | 7/1920 | |
| KR | 101089115 | B1 * | 12/2011 | |
| KR | 20140055716 | A * | 5/2014 | |
| KR | 20150016815 | A * | 2/2015 | |
| WO | 98/51122 | | 11/1998 | |
| WO | WO-0109519 | A1 * | 2/2001 | F15C 5/00 |
| WO | WO-2010010550 | A1 * | 1/2010 | H04R 25/75 |
| WO | WO-2015101505 | A1 * | 7/2015 | H04R 1/1041 |

OTHER PUBLICATIONS

Jutzi, Fabio, et al., "Low Voltage Electrostatic 90° Turning Flap for Reflective MEMS Display," 2010 International Conference on Optical MEMS & Nanphotonics, 2010, pp. 77-78.

Jhabvala, M.D., et al., "Development and operation of the microshutter array system," Proceedings of SPIE—The International Society for Optical Engineering, Apr. 2008, 13 pages.

Syms, R.R.A., et al., "Sliding-blade MEMS iris and variable optical attenuator," Journal of Micromechanics and Microengineering, vol. 14, Sep. 2004, pp. 1700-1710.

Roy, Nirupam, et al., "Inaudible Voice Commands: The Long-Range Attack and Defense," Proceedings of the 15th USENIX Symposium on Networked Systems Design and Implementation (NSDI '18), Apr. 9-11, 2018, pp. 547-560.

Jimenez, Noe, et al., "Rainbow-trapping absorbers: Broadband, perfect and asymmetric sound absorption by subwavelength panels for transmission problems," Scientific Reports, 7: 13595, Oct. 19, 2017, pp. 1-12.

* cited by examiner

DYNAMIC VALVE FOR AN ELECTRONIC DEVICE

CROSS-REFERENCE TO RELATED APPLICATIONS

The application is a non-provisional application of co-pending U.S. Provisional Patent Application No. 63/245,570, filed Sep. 17, 2021, and U.S. Provisional Patent Application No. 63/247,435, filed Sep. 23, 2021, both of which are incorporated herein by reference.

FIELD

An aspect of the disclosure is directed to a dynamic valve assembly for an electronic device, including a sliding or shutter type valve for an electronic device. Other aspects are also described and claimed.

BACKGROUND

Portable communications or listening devices (e.g., smart phones, earphones, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, or to output sound pressure waves corresponding to sounds associated with a game or music the user wishes to play. Due to the relatively low profile of the portable devices, the transducers also have a relatively low profile, which in turn, can make it difficult to maintain optimal sound quality.

SUMMARY

An aspect of the disclosure is directed to a dynamic valve that can be used to control an amount of leak between an inner cavity and ambient. Representatively, in the case of earphones, in some cases a perfect seal (high impedance) is desired, whereas in other cases a very open path (low impedance) is desired. Representatively, in some cases, where the earphone fits relatively tightly within the ear and forms a seal with the ear canal, or at least a partial seal, user's may experience an undesirable occlusion effect. For example, during active noise control (ANC) or noise cancellation, the user may want the in-ear device to be isolated with passive isolation and ANC (closed valve) but when outdoors it may be desirable for transparency (open valve) so there is a more natural and lower occlusion effect when speaking. The valve therefore allows for the amount of leak to be dynamically controlled during system operation depending on the desired level of leak, and with lower power consumption.

Representatively, in some aspects, the disclosure is directed to a portable electronic device (e.g., a wearable such as an earphone) including an enclosure having an enclosure wall that forms an interior chamber and an opening to an environment surrounding the enclosure wall; and a valve comprising a number of sliding actuators operable to open and close the opening to the environment surrounding the enclosure wall. In some aspects, each of the sliding actuators are arranged around the opening and are operable to slide in a direction parallel to a plane of the enclosure wall to open and close the opening. In still further aspects, each of the sliding actuators include a static portion fixed to the enclosure wall and a sliding portion, wherein the sliding portion slides over the opening to a closed configuration in which the opening is covered and slides away from the opening to an open configuration in which the opening is uncovered. In some aspects, the sliding portion is biased toward the closed configuration by a spring coupled to each of the sliding actuators. In some aspects, each of the sliding actuators comprise a comb drive operable to transition from a closed configuration in which the opening is covered to an open configuration in which the opening is uncovered upon application of a voltage. In some aspects, each of the sliding actuators of the number of sliding actuators are independently operable to open and close the opening.

In still further aspects, the disclosure is directed to a portable electronic device including an enclosure having an enclosure wall that forms an interior chamber and a sound output port to an ambient environment; a transducer positioned within the interior chamber and dividing the interior chamber into a front volume chamber comprising a first side of the transducer and the sound output port and a back volume chamber comprising a second side of the transducer; and an electromechanical valve comprising a number of rotating actuators operable to open and close a vent to the interior chamber, the front volume chamber or the back volume chamber. In some aspects, the number of rotating actuators are operable to rotate about an axis that runs parallel to an axis of the vent. In some aspects, each of the number of rotating actuators comprise a triangular shaped member having a base portion connected to the enclosure at a pivot point. In some aspects, the number of rotating actuators are interconnected such that all of the number of rotating actuators rotate together to open or close the vent. In some aspects, the rotation of the number of rotating actuators is mechanically driven by a lever.

In still further aspects, the disclosure is directed to a valve assembly for a portable electronic device, the valve assembly including a number of sliding actuators operable to open and close an opening formed through an enclosure wall, each of the number of sliding actuators comprising: a static portion fixedly coupled to the enclosure wall; and a sliding portion slidably coupled to the static portion, and wherein the sliding portion is operable to slide in a direction parallel to a plane of the enclosure wall through which the opening is formed between a closed configuration in which the opening is covered by the sliding portion and an open configuration in which the opening is uncovered by the sliding portion. In some aspects, the sliding portion is biased toward the closed configuration by a spring coupled to each of the sliding actuators. In some aspects, the sliding portion is operable to slide from the closed configuration to the open configuration upon application of a voltage. In some aspects, the static portion includes a first conductive finger structure and the sliding portion comprises a second conductive finger structure complimentary to the first conductive finger structure, and wherein the second conductive finger structure is driven toward the first conductive finger structure upon application of a voltage in the open configuration. In some aspects, each of the sliding actuators of the number of actuators include a comb drive. In some aspects, each of the number of sliding actuators include at least four sliding actuators arranged around the opening. In some aspects, the sliding portion of each of the number of sliding actuators slide toward a center of the opening. In still further aspects, each of the sliding actuators of the number of sliding actuators are independently operable to slide between the open configuration and the closed configuration. In some aspects, the opening is through a portion of the enclosure wall that separates a front volume chamber or a back volume chamber of a transducer from an ambient environment, and wherein opening and closing the opening using the number of sliding actuators opens and closes the front volume chamber or the back volume chamber to the ambient environment.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
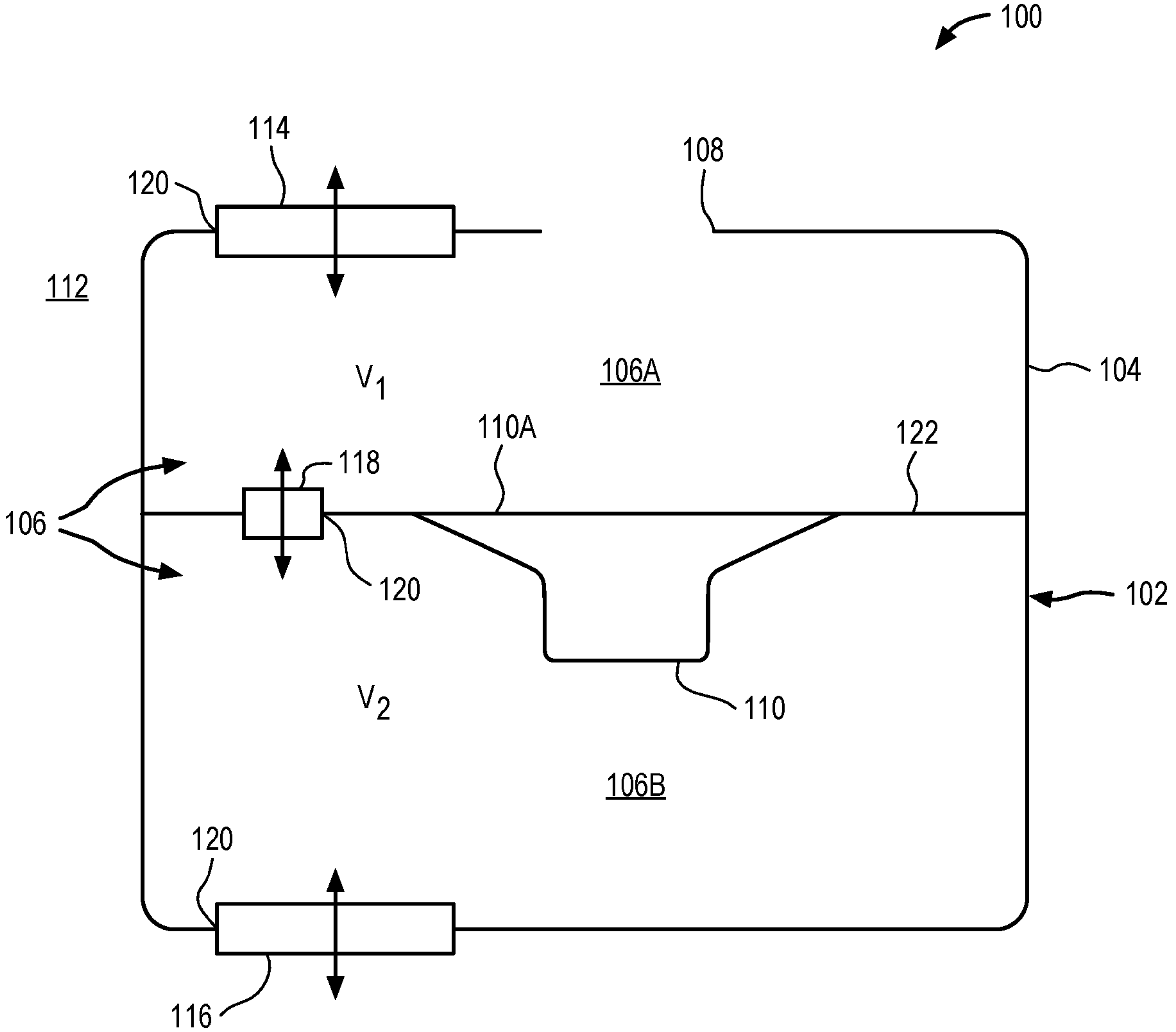
FIG. 1 illustrates a cross-sectional side view of one aspect of a portable electronic device and/or transducer assembly having a valve.

FIG. 1 illustrates a cross-sectional side view of one aspect of a valve assembly for a transducer positioned within a portable electronic device. The electronic device 100 may include a housing, casing or outer enclosure 102 that defines or closes off a chamber in which the constituent electronic components of electronic device 100 are contained. In some aspects, it is contemplated that device 100 may be a portable or mobile communications device, an in-ear device, portable time piece or any other device within which a transducer may be implemented. Enclosure 102 may include an enclosure wall 104 that separates a surrounding environment from an encased space or interior chamber 106 formed within enclosure 102. In some cases, the enclosure wall 104 completely isolates or seals the entire, or a portion of, interior chamber 106 from the surrounding environment. For example, the enclosure wall 104 may form a water-proof or acoustically isolated portion of interior chamber 106 which is impermeable to water and/or air. The interior chamber 106 may be of a sufficient volume and/or size to accommodate the constituent components of electronic device 100. The enclosure wall 104 may also include one or more of an acoustic port 108. The acoustic port 108 may be, for example, a sound output port through which sound from a speaker positioned within interior chamber 106 may be output. In other aspects, where a microphone is positioned near enclosure acoustic port 108, it could be a sound input port to allow for input of sound to the microphone.

Representatively, in one aspect shown in FIG. 1, enclosure acoustic port 108 is an acoustic port that is acoustically open to a transducer 110 positioned within interior chamber 106. In some aspects, transducer 110 may be any type of electroacoustic transducer capable of converting an electrical audio signal into a sound or a sound into an electrical audio signal. Representatively, transducer 110 may be a speaker or a micro-speaker, for example, a miniaturized version of a loudspeaker that uses a moving coil motor to drive sound output. Thus, in some aspects, transducer 110 may be referred to herein as a micro-speaker. In other aspects, where transducer 110 converts sound into an electrical audio signal, it may further be referred to herein as a microphone. In some aspects, transducer 110 may be coupled to an interior wall 122 and be considered to divide interior chamber 106 into a front volume chamber 106A and a back volume chamber 106B around transducer 110. In the case where transducer 110 is a speaker, front volume chamber 106A may form a chamber having a first volume (V1) around the sound output face or surface 110A of transducer 110. The front volume chamber 106A (and first volume V1) may be considered acoustically coupled to, or otherwise open to, acoustic port 108. In this aspect, sound pressure waves output from surface 110A of transducer 110 may pass through front volume chamber 106A and out to the surrounding ambient environment 112 through acoustic port 108. Back volume chamber 106B may have a second volume (V2) and surround the back side of transducer 110 (e.g., the side of transducer 110 opposite surface 110A).

It is recognized that, for example, a size, volume, pressure or other aspects of front volume chamber 106A or back volume chamber 106B may impact the acoustic performance of transducer 110. Thus, modifying the size, volume and/or pressure of front volume chamber 106A and/or back volume chamber 106B may be used to tune the acoustic performance of transducer 110. For example, in some cases, it may be desirable for front volume chamber 106A and/or back volume chamber 106B to be isolated or sealed (e.g., high impedance) from the ambient environment 112 to achieve the desired acoustic performance. In other cases, it may be desirable for front volume chamber 106A and/or back volume chamber 106B to have a very open path (e.g., low impedance) and have some amount of leak to the surrounding ambient environment 112. In still further aspects, it may be desirable for front volume chamber 106A to have a leak, or otherwise be open to, back volume chamber 106B.

With this in mind, valve assemblies or valve(s) 114, 116 and/or 118 may further be provided to vent an associated chamber. Valve 114, 116, and/or 118 may open and/or close a vent or opening 120 from front volume chamber 106A and/or back volume chamber 106B to the ambient environment 112, or a vent or opening 120 between front and back volume chambers 106A-B. Representatively, valve 114 may open and/or close opening 120 formed through wall 104 between front volume chamber 106A and ambient environment 112. In other words, when valve 114 is open, front volume chamber 106A can leak or vent to ambient environment 112 and when valve 114 is closed, the leak or venting is prevented. A leak or venting may be desired from front volume chamber 106A where, for example, device 100 is an in-ear earpiece sealed within the user's ear but a more open feel is desired. Valve 116 may open and/or close opening 120 through wall 104 between back volume chamber 106B and ambient environment 112. In other words, when valve 116 is open, front volume chamber 106A can leak or vent to back volume chamber 106B, and when valve 116 is closed, the leak or venting is prevented. Valve 118 may open and/or close opening 120 through wall 122 between front volume chamber 106A and back volume chamber 106B. In this aspect, when valve 118 is open, back volume chamber 106B can leak or vent to back volume chamber 106B, and when valve 118 is closed, the leak or vent is prevented. In still further aspects, it is contemplated that one or more of valves 114, 116, 118 could be used to open and/or close an opening (e.g., opening 120) which is to another type of acoustic chamber, for example, an opening to an acoustic resonator or attenuator coupled to one or more of the previously discussed chambers or ports of the transducer.

In one aspect, one or more of valves 114, 116, 118 may be electromechanical valves that open and/or close in response to the application of a voltage. In this aspect, valves 114, 116, 118 may be dynamically actuated to control the amount of leak. In some aspects, one or more of valves 114, 116, 118 may be micro-electromechanical systems (MEMS) actuators or valves. Valves 114, 116, 118 may be the same, or may be different. In some aspects, one or more of valves may offer the advantages of bistability, low power consumption switching from on/off states, digitization for controlling a percentage or amount of open area for venting, and/or silent operation. A number of representative configurations for valves 114, 116, 118 will now be described in reference to FIG. 2A-FIG. 3B.

Figure 2A:
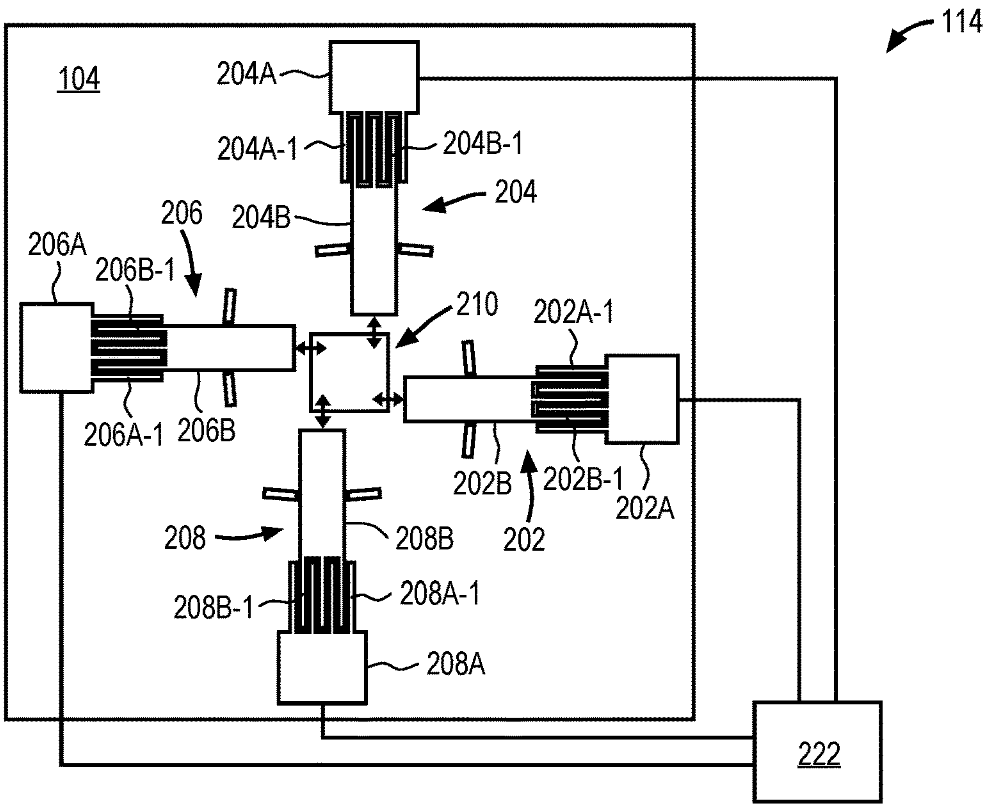
FIG. 2A illustrates a top plan view of one aspect of a valve of the portable electronic device and/or transducer assembly of FIG. 1 in an open configuration.
Figure 2B:
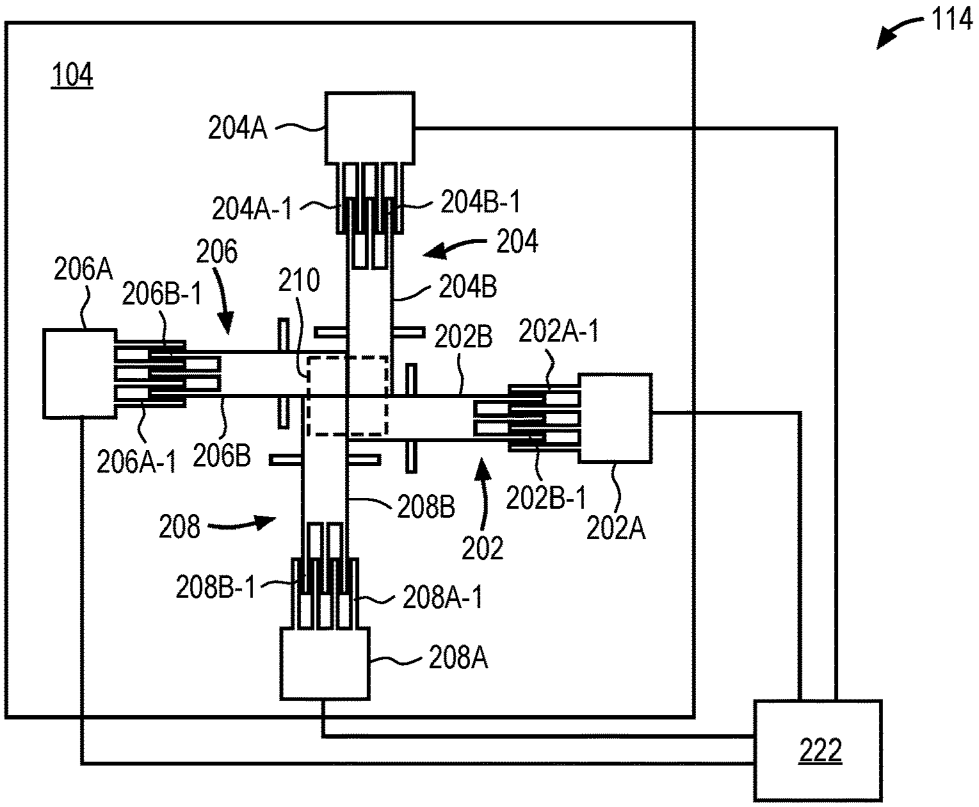
FIG. 2B illustrates a top plan view of one aspect of a valve of a portable electronic device and/or transducer assembly of FIG. 1 in a closed configuration.

Representatively, FIGS. 2A-2B illustrate a top plan view of a representative valve from FIG. 1. In this aspect, FIG. 2A shows valve 114 used to open/close opening 210 formed in an enclosure wall (e.g., enclosure wall 104 of FIG. 1) in an open position while FIG. 2B shows valve 114 in a closed position. It should be understood, however, that although valve 114 is specifically discussed, one or more of valves 116 and/or 118 may be the same as valve 114 such that the description provided herein also applies to any other valves disclosed in FIG. 1. From this view, it can be seen that valve 114 is made up of a number of actuators 202, 204, 206, 208 that together operate to open/close opening 210. Representatively, actuators 202, 204, 206, 208 may be electromechanical sliding actuators that are controlled by application of a voltage. It should further be understood that although four actuators 202, 204, 206, 208 are shown, any number of actuators necessary to open/close opening 210 may be used. In addition, actuators 202, 204, 206, 208 may be suitable for opening/closing any size opening 210, for example, a small to medium sized opening or a slit.

Referring now in more detail to actuators 202, 204, 206, 208, each of actuators may be sliding actuators including an anchored finger portion and a sliding biased portion that moves to open (uncover)/close (cover) opening 210. Representatively, actuator 202 includes a static or anchored portion 202A and a moving or sliding portion 202B. In some aspects, actuator 202 may be comb drives or actuators including electrically conductive combs that can be driven toward and/or away from one another upon application of a voltage. Representatively, the anchored portion 202A may be fixedly attached to, for example, the enclosure wall or housing through which opening 210 is formed and include an electrically conductive comb or finger 202A-1 that faces toward opening 210. Fingers 202A-1 may be dimensioned to receive the sliding portion 202B. Representatively, the sliding portion 202B may include an electrically conductive comb or fingers 202B-1 that are complimentary to fingers 202A-1 such that fingers 202B-1 slide between fingers 202A-1 (or vice versa). The sliding portion 202B may slide in a direction of the arrows, which is parallel to the plane of the enclosure wall the opening 210 is formed in. Said another way, sliding portion 202B may slide in a direction perpendicular to an axis of opening 210. In this aspect, when sliding portion 202B slides over opening 210 (closed position), it covers a portion of opening 210. On the other hand, when sliding portion 202B slides away from opening 210 the portion of the opening 210 is uncovered (open position) as shown in FIG. 2B. In some aspects, sliding portion 202B includes a spring or other biasing mechanism that biases the sliding portion 202B away from the anchored portion 202A and therefore toward the closed position shown in FIG. 2B. Representatively, in its natural or resting portion (e.g., no voltage is applied), sliding portion 202B covers opening 210 as shown in FIG. 2B. Upon application of a voltage, the biasing force is overcome by the electrostatic forces between the combs and the sliding portion 202B is caused to slide toward anchored portion 202A as shown in FIG. 2A. This, in turn, uncovers or opens the opening 210 such that the volumes or chambers on opposite sides of the opening 210 are now connected or otherwise open to one another and so that venting can occur.

Actuators 204, 206 and 208 are substantially similar to sliding actuator 202 and operate in a similar manner to open/close opening 210. Representatively, actuator 204 includes an anchored portion 204A having an electrically conductive comb or fingers 204A-1 and a sliding portion 204B having an electrically conductive comb or fingers 204B-1 that slide relative to fingers 204A-1 in the direction of the arrow, as previously discussed. Actuator 206 includes an anchored portion 206A having an electrically conductive comb or fingers 206A-1 and sliding portion 206B having an electrically conductive comb or fingers 206B-1 that slide relative to fingers 206A-1 in the direction of the arrow, as previously discussed. Actuator 208 includes an anchored portion 208A having an electrically conductive comb or fingers 208A-1 and sliding portion 208B having an electrically conductive comb or fingers 208B-1 that slide relative to fingers 208A-1 in the direction of arrow, as previously discussed. Similar to sliding actuator 202, sliding actuators 204, 206, 208 transition to the open position shown in FIG. 2A upon application of a voltage. Once the voltage is removed, the biasing force of the sliding portions 204B, 206B, 208B causes the sliding portions 204B, 206B, 208B to move (slide) back to the closed position shown in FIG. 2B. When all actuators 202, 204, 206, 208 are in the closed position shown in FIG. 2B, the opening 210 is completely covered and therefore closed. It should be understood, however, that each of actuators 202, 204, 206, 208 may be controlled in parallel (e.g., all opened or all closed) while in other aspects they may be independently or separately controlled. For example, a voltage may be applied to one or more of actuators 202, 204, 206, 208 to open one or more of actuators 202, 204, 206, 208 while a voltage is not applied to others such that the others remain closed. This allows for partial opening/closing of opening 210 depending on the desired level of venting. For example, where less venting is desired, only one of actuators 202, 204, 206, 208 may be opened while the others remain closed such that only a small portion of opening 210 is open to venting between the associated chambers. On the other hand, where more venting is desired, more than one of actuators 202, 204, 206, 208 may be opened so that a larger portion of opening 210 is open to venting between the associated chambers. In some aspects, the device may have an application-specific integrated circuit (ASIC) 222 that connects with, and is used to apply the voltage necessary to, dynamically control each of actuators 202, 204, 206, 208. It may further be understood that an advantage of using actuators 202, 204, 206, 208 that slide to open/close opening 210 as disclosed herein is that they avoid the high sound pressure levels (SPL) that may occur when rotating valve flaps are instead used. In particular, actuators 202, 204, 206, 208 have a very low decibel SPL when transitioning between open/closed positions because they are operating in a direction perpendicular to (or across) the opening 210 as opposed to parallel to (or into) the opening 210. As a result, they do not push air into opening 210, or an associated chamber or channel connected to opening 210, or otherwise cause a large volume displacement which could lead to higher SPLs.

Figure 3A:
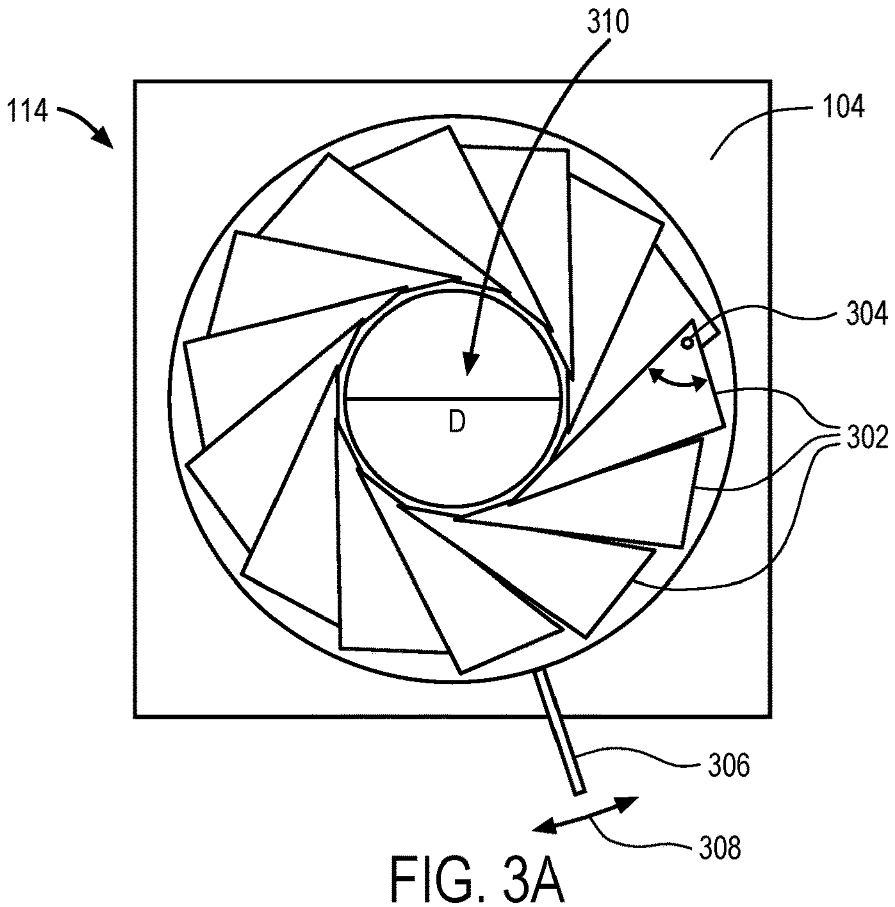
FIG. 3A illustrates a top plan view of one aspect of a valve of a portable electronic device and/or transducer assembly of FIG. 1 in an open configuration.
Figure 3B:
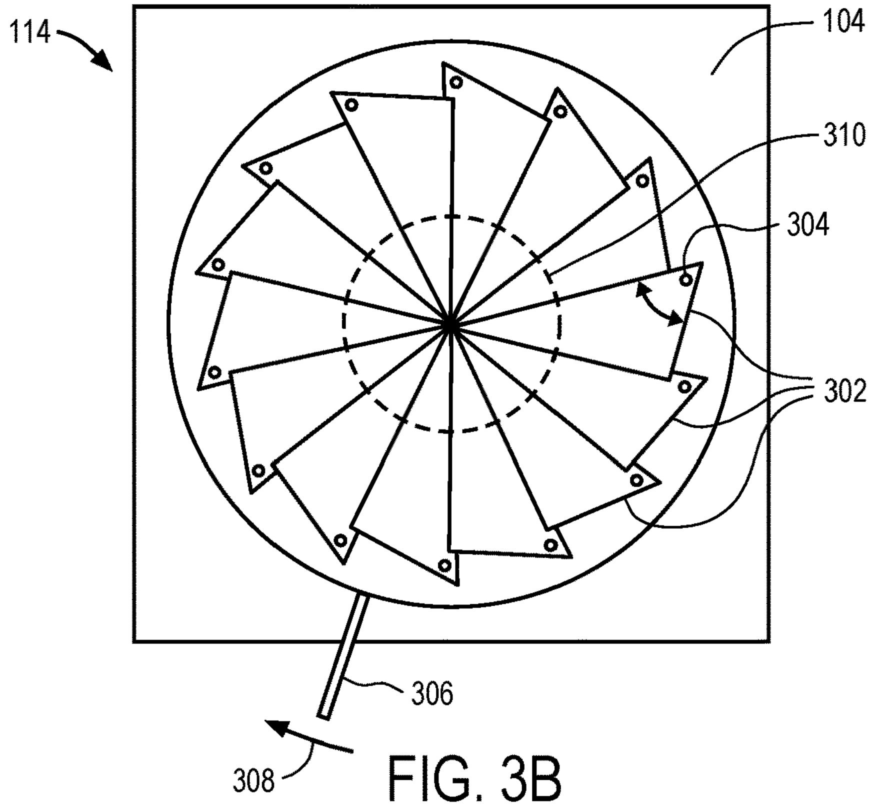
FIG. 3B illustrates a top plan view of one aspect of a valve of a portable electronic device and/or transducer assembly of FIG. 1 in a closed configuration.

Referring now to FIGS. 3A-3B, FIGS. 3A-3B illustrate top plan views of a representative valve from FIG. 1. In this aspect, FIGS. 3A-3B show valve 114 used to open/close opening 210 formed in an enclosure wall (e.g., enclosure wall 104 of FIG. 1). As previously discussed, however, the description of valve 114 applies to any one or more of valves 116 and/or 118 disclosed in FIG. 1. In some aspects, valve may be a shutter type valve similar to that which may be found in a camera and which will allow the user to control the size of the opening 210, and in turn, the amount of venting between the associated chambers. Representatively, valve 114 may be made up of a number of actuators 302 that rotate about a pivot point or hinge 304 and together operate to open/close opening 310. In some aspects, actuators 302 may be mechanical actuators that are mechanically or manually controlled without an electrical input. In other aspects, actuators 302 may be electromechanical actuators that are controlled by application of a voltage. It should further be understood that any number of actuators 302 necessary to open/close opening 310 may be used. In addition, actuators 302 may be suitable for opening/closing any size opening 310, for example, a small to medium sized opening, a slit, a circular opening or the like.

Referring now in more detail to actuators 302, each of actuators 302 may be coupled to the enclosure wall or surface through which the opening 310 is formed at a pivot point 304. The actuators 302 are operable to rotate around the pivot point 304 (as shown by the arrow) between an open position in which the opening 310 is not covered (FIG. 3A) and a closed position in which the opening 310 is covered (FIG. 3B). The actuators 302 may rotate within a plane parallel to the plane of the enclosure wall the opening 310 is formed in. Said another way, actuators 302 may rotate around an axis (or pivot point 304) that runs parallel to an axis of opening 310. In some aspects, actuators 302 may have a triangular shape as shown. In this aspect, the pivot point 304 may be at a corner of the base or widest end of the triangularly shaped actuators 302 while the body and apex of the triangle extends into opening 310 and is used to cover opening 310. In this aspect, as the actuators 302 rotate in one direction around pivot point 304 (e.g., clockwise direction), the pointed ends of each of actuators 302 extend further into opening 310 until they eventually cover opening 310 as shown in FIG. 3B. When the actuators 302 rotate in the other direction around pivot point 304 (e.g., counterclockwise), the pointed ends of each of actuators 302 move away from opening 310 until they eventually uncover opening 310 as shown in FIG. 3A. In some aspects, actuators 302 may be interconnected such that the rotation of one of actuators 302 may drive rotation of all the actuators 302. Actuators 302 may be rotated to a number of positions between the fully open and closed positions shown in FIGS. 3A-3B depending on the desired diameter (D) of opening 310. Representatively, actuators 302 may be rotated to a fully open position (FIG. 3A), fully closed position (FIG. 3B) or between the open/closed position such that opening is less than diameter D.

As previously discussed, actuators 302 may be mechanical actuators that are mechanically or manually controlled without an electrical input. Representatively, in some aspects, an actuating arm or lever 306 may be coupled to one or more of actuators 302, or another mechanism which can be used to transfer a force of actuating arm or lever 306 to actuators 302. Actuating arm or lever 306 may be advanced in a direction parallel to the arrow as shown to rotate actuators 302 to the open or closed positions as previously discussed. Representatively, in one aspect, actuating arm or lever 306 may be advanced to the left to transition actuators 302 to the closed position shown in FIG. 3B. To transition actuators 302 back to the open position, actuating arm or lever 306 may be advanced to the right. In some aspects, the actuating arm or lever 306 must continue to be positioned to the right (or in the open position) to keep actuators 302 in the open position. In some aspects, zero open power may be used by incorporating a bias-spring or a bistable component into actuators 302 and/or lever 306. For example, actuators 302 may be bistable actuators that can maintain both the open and closed positions in the absence of power. In still further aspects, it is contemplated that a magnetic component may be incorporated into the actuator arm or lever 306 and use a magnet to lock the lever and hold it in the open or closed position with zero power. In still further aspects, it is contemplated that actuators 302 may include shape/memory allows that remember mechanical positions based on temperature (e.g., heat/cool) and help to maintain the position of lever 306.

It should be understood that although the valves disclosed herein are primarily described in the context of an acoustic application, they may be used with any type of electronic device where dynamic control of a size of a vent, port, slit, channel or other opening is desired. For example, the valves may be used for controlling a camera aperture size.

Figure 4:
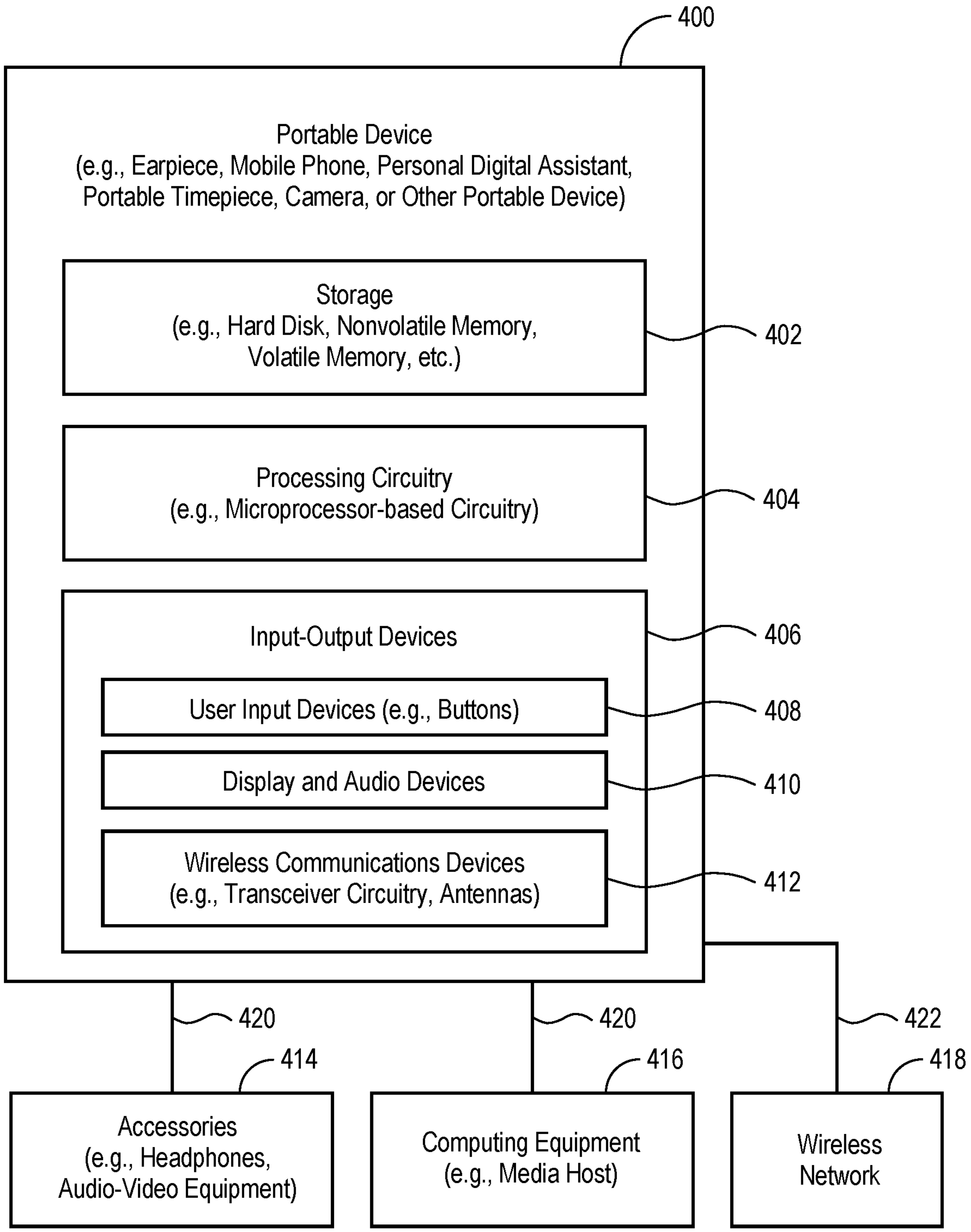
FIG. 4 illustrates a block diagram of one aspect of an electronic device within which a transducer including the valve assembly of FIG. 1-FIG. 3B may be implemented.

FIG. 4 illustrates a block diagram of one aspect of an electronic device within which the previously discussed transducer and/or valve assembly may be implemented. As shown in FIG. 4, device 400 may be any type of portable device within which a transducer and/or valve assembly disclosed herein may be desired, for example, an earpiece (e.g., in-ear earpiece, hearing aid or the like), mobile phone, personal digital assistant, portable timepiece, camera or other portable device. Device 400 may include storage 402. Storage 402 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 404 may be used to control the operation of device 400. Processing circuitry 404 may be based on a processor such as a microprocessor and other suitable integrated circuits. With one suitable arrangement, processing circuitry 404 and storage 402 are used to run software on device 400, such as internet browsing applications, voice-over-internet-protocol (VOIP) telephone call applications, email applications, media playback applications, operating system functions, etc. Processing circuitry 404 and storage 402 may be used in implementing suitable communications protocols. Communications protocols that may be implemented using processing circuitry 404 and storage 402 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 404 may include power management circuitry to implement power management functions. For example, processing circuitry 404 may be used to adjust the gain settings of amplifiers (e.g., radio-frequency power amplifier circuitry) on device 400. Processing circuitry 404 may also be used to adjust the power supply voltages that are provided to portions of the circuitry on device 400. For example, higher direct-current (DC) power supply voltages may be supplied to active circuits and lower DC power supply voltages may be supplied to circuits that are less active or that are inactive. If desired, processing circuitry 404 may be used to implement a control scheme in which the power amplifier circuitry is adjusted to accommodate transmission power level requests received from a wireless network.

Input-output devices 406 may be used to allow data to be supplied to device 400 and to allow data to be provided from device 400 to external devices. Display screens, microphone acoustic ports, speaker acoustic ports, and docking ports are examples of input-output devices 406. For example, input-output devices 406 can include user input-output devices 608 such as buttons, touch screens, joysticks, click wheels, scrolling wheels, touch pads, key pads, keyboards, microphones, cameras, etc. A user can control the operation of device 400 by supplying commands through user input devices 408. Display and audio devices 410 may include liquid-crystal display (LCD) screens or other screens, light-emitting diodes (LEDs), and other components that present visual information and status data. Display and audio devices 410 may also include audio equipment such as speakers and other devices for creating sound. Display and audio devices 410 may contain audio-video interface equipment such as jacks and other connectors for external headphones and monitors.

Wireless communications devices 412 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 4, device 400 can communicate with external devices such as accessories 414, computing equipment 416, and wireless network 418 as shown by paths 420 and 422. Paths 420 may include wired and wireless paths. Path 422 may be a wireless path. Accessories 414 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 416 may be any suitable computer. With one suitable arrangement, computing equipment 416 is a computer that has an associated wireless access point (router) or an internal or external wireless card that establishes a wireless connection with device 400. The computer may be a server (e.g., an internet server), a local area network computer with or without internet access, a user's own personal computer, a peer device (e.g., another portable electronic device), or any other suitable computing equipment.

Wireless network 418 may include any suitable network equipment, such as cellular telephone base stations, cellular towers, wireless data networks, computers associated with wireless networks, etc. For example, wireless network 418 may include network management equipment that monitors the wireless signal strength of the wireless handsets (cellular telephones, handheld computing devices, etc.) that are in communication with network 418.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although a speaker is specifically disclosed herein, the valve disclosed herein could be used with other types of transducers, for example, microphones. In addition, in some aspects, the valve could be used to open/close the opening to an acoustic resonator or attenuator coupled to a transducer. Still further, although a portable electronic device such as a mobile communications device is described herein, any of the previously discussed valve and transducer configurations may be implemented within a tablet computer, personal computer, laptop computer, notebook computer, headphones and the like. Moreover, in some aspects, the valve assemblies disclosed herein could be used with other types of electronic devices, for example, a camera. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A portable electronic device comprising:

an enclosure having an enclosure wall that forms an interior chamber and an opening to an environment surrounding the enclosure wall; and a valve comprising a number of sliding actuators operable to open and close the opening to the environment surrounding the enclosure wall, and at least one sliding actuator of the number of sliding actuators is operable to transition between an open configuration and a closed configuration independent of another of the number of sliding actuators.

2. The portable electronic device of claim 1 wherein each of the sliding actuators are arranged around the opening and are operable to slide in a direction parallel to a plane of the enclosure wall to open and close the opening to modify an acoustic performance of the portable electronic device.

3. The portable electronic device of claim 1 wherein each of the sliding actuators comprise a static portion fixed to the enclosure wall and a sliding portion, wherein the sliding portion slides over the opening to the closed configuration in which the opening is covered and slides away from the opening to the open configuration in which the opening is uncovered.

4. The portable electronic device of claim 3 wherein the sliding portion is biased toward the closed configuration by a spring coupled to each of the sliding actuators.

5. The portable electronic device of claim 1 wherein each of the sliding actuators comprise a comb drive operable to transition from the closed configuration in which the opening is covered to the open configuration in which the opening is uncovered upon application of a voltage.

6. The portable electronic device of claim 1 wherein each of the sliding actuators of the number of sliding actuators are independently operable to open and close the opening.

7. A portable electronic device comprising:

an enclosure having an enclosure wall that forms an interior chamber and a sound output port to an ambient environment;

a transducer positioned within the interior chamber and dividing the interior chamber into a front volume chamber comprising a first side of the transducer and the sound output port and a back volume chamber comprising a second side of the transducer; and an electromechanical valve comprising a number of rotating actuators operable to open and close a vent to the interior chamber, the front volume chamber or the back volume chamber, and wherein the electromechanical valve comprises a spring member operable to bias the electromechanical valve to an open configuration or a closed configuration in the absence of power.

8. The portable electronic device of claim 7 wherein the number of rotating actuators are operable to rotate about an axis that runs parallel to an axis of the vent.

9. The portable electronic device of claim 7 wherein each of the number of rotating actuators comprise a triangular shaped member having a base portion connected to the enclosure at a pivot point.

10. The portable electronic device of claim 7 wherein the number of rotating actuators are interconnected such that all of the number of rotating actuators rotate together to open or close the vent.

11. The portable electronic device of claim 7 wherein a rotation of the number of rotating actuators is mechanically driven by a lever.

12. A valve assembly for a portable electronic device, the valve assembly comprising:

a number of sliding actuators operable to open and close an opening formed through an enclosure wall, each of the number of sliding actuators comprising:

a static portion fixedly coupled to the enclosure wall; and a sliding portion slidably coupled to the static portion, and wherein the sliding portion is operable to slide in a direction parallel to a plane of the enclosure wall through which the opening is formed between a closed configuration in which the opening is covered by the sliding portion and an open configuration in which the opening is uncovered by the sliding portion, and wherein at least one sliding portion of the number of sliding actuators is independently operable to slide between the open configuration and the closed configuration.

13. The valve assembly of claim 12 wherein the sliding portion is biased toward the closed configuration by a spring coupled to each of the sliding actuators.

14. The valve assembly of claim 12 wherein the sliding portion is operable to slide from the closed configuration to the open configuration upon application of a voltage.

15. The valve assembly of claim 12 wherein the static portion comprises a first conductive finger structure and the sliding portion comprises a second conductive finger structure complimentary to the first conductive finger structure, and wherein the second conductive finger structure is driven toward the first conductive finger structure upon application of a voltage in the open configuration.

16. The valve assembly of claim 12 wherein each of the sliding actuators of the number of actuators comprise a comb drive.

17. The valve assembly of claim 12 wherein the number of sliding actuators comprise at least four sliding actuators arranged around the opening.

18. The valve assembly of claim 12 wherein the sliding portion of each of the number of sliding actuators slide toward a center of the opening.

19. The valve assembly of claim 12 wherein the opening is through a portion of the enclosure wall that separates a front volume chamber or a back volume chamber of a transducer from an ambient environment, and wherein opening and closing the opening using the number of sliding actuators opens and closes the front volume chamber or the back volume chamber to the ambient environment.

* * * * *